United States Patent [19]

Fleet

[11] 4,172,008
[45] Oct. 23, 1979

[54] NUCLEAR FUSION REACTOR

[75] Inventor: John H. Fleet, Inverness, Fla.

[73] Assignee: Dubble Whammy, Inc., Inverness, Fla.

[21] Appl. No.: 827,069

[22] Filed: Aug. 23, 1977

[51] Int. Cl.² .............................................. G21B 1/00
[52] U.S. Cl. ........................................ 176/5; 176/1; 176/2; 176/7; 176/3
[58] Field of Search ........................ 176/1, 2, 3, 6–8, 176/5

[56] References Cited

U.S. PATENT DOCUMENTS

| | | | |
|---|---|---|---|
| 3,096,269 | 7/1963 | Halbach et al. | 176/2 |
| 3,571,734 | 3/1971 | Consoli et al. | 176/2 |
| 3,779,864 | 12/1973 | Kaw et al. | 176/7 |
| 3,859,164 | 1/1975 | Nowak | 176/5 |
| 3,935,503 | 1/1976 | Ress | 176/2 |

FOREIGN PATENT DOCUMENTS 993174  5/1965  United Kingdom ................. 176/2

OTHER PUBLICATIONS

IEEE Proceedings, vol. 64, No. 10, 10/76, pp. 1469–1471.

*Primary Examiner*—Harvey E. Behrend
*Attorney, Agent, or Firm*—Brady, O'Boyle & Gates

[57] ABSTRACT

A rapidly pulsed nuclear fusion reaction system including a firing chamber into which synchronized opposing beams of ionized gas such as deuterium/tritium are injected in the form of ion pulses which are adapted to collide at the mid point of the chamber. The pulsed ion beams are fed through respective orifices across which is applied a relatively high DC voltage. External to the firing chamber is means for generating a pulsed magnetic field interiorally of the chamber along the ion travel path and in synchronism therewith to provide a guiding effect of the two opposing ion beams to the precise center of the firing chamber. At the moment the leading edges of the ion beams meet, an electric arc is developed due to the voltage applied across the orifice. The arc strips electrons from the ions and an electron sheath acting to increase the packing fractions of the beams is formed between the orifices leaving bare nuclei to accumulate in density which are further confined by the action of the electron sheath itself. A fuel gas ball is thus formed at the center of the firing chamber which is then ignited to fusion temperature by a pair of lasers or a pair of high energy electron beams. The resulting release of energy is collected as heat at the outer surface of the firing chamber by means of the structure comprising the magnetic field generating means which is also adapted to capture neutrons.

24 Claims, 8 Drawing Figures

NUCLEAR FUSION REACTOR

BACKGROUND OF THE INVENTION

1. Field of the Invention

This invention relates generally to nuclear fusion technology and more particularly to a method and apparatus for the development of usable power using accelerated ion beams or plasmas of deuterium/tritium or the like directed along collision courses whereby the particles in the beams collect in a specified collision area, such as a vacuum firing chamber adapted to sustain a nuclear reaction.

2. Description of the Prior Art

Controlled nuclear fusion consists in harnessing the energy released during the combination of very light atomic nucleii to form relatively heavier nucleii. In contrast to nuclear fission power reactors, fusion power reactors require input energy to establish the fuel conditions necessary for appreciable nuclear energy release. Input energy is required in order to heat the fusion fuel to an extremely high termonuclear temperature, e.g. $1 \times 10^8$ degrees Kelvin (°K) in order to give the positively charged fuel nucleii sufficient energy to overcome their mutual electrostatic repulsion. The fuel and nucleii are formed of an ionized gas or plasma which has a tendency to expand. If useful amounts of energy, however, are to be derived from nuclear fusion, the plasma must be confined at fusion temperatures for an adequate length of time. This fundamental requirement is known as Lawson's Criterion and is a function of the product of fuel density and the confinement time and has been determined to be in the order of $1 \times 10^{14}$. This is a condition at which the fusion energy release equals the energy input necessary to heat and confine the plasma. Of all the fusion fuels currently under consideration, the deterium/tritium mixture requires the lowest value of this product as well as the lowest fusion temperature.

Pursuant to the duty to disclose information to the Patent and Trademark Office which is material to the examination of the subject application, the following listing comprises prior art of which the applicant and those who are substantially involved in the preparation and prosecution of the subject application deems pertinent:

(a) Patents:
  U.S. Pat. No. 2,940,011—A. C. Kolb
  U.S. Pat. No. 2,992,345—S. Hansen
  U.S. Pat. No. 3,109,801—P. C. Thonemann
  U.S. Pat. No. 3,155,592—S. Hansen, et al.
  U.S. Pat. No. 3,346,458—P. Schmidt
  U.S. Pat. No. 3,361,634—L. D. Smullin
  U.S. Pat. No. 3,652,393—Kaiser
  U.S. Pat. No. 3,679,897—D. Hansen, et al.
  U.S. Pat. No. 3,755,073—A. Haugt, et al.
  U.S. Pat. No. 3,762,992—J. Hedstrom
  U.S. Pat. No. 3,766,004—T. Roberts, et al.
  U.S. Pat. No. 3,779,864—P. Kaw et al.
  U.S. Pat. No. 3,808,550—A. Ashkin
  U.S. Pat. No. 3,898,587—W. Brinkman, Jr., et al.
  U.S. Pat. No. 3,935,504—P. Guillaneux, et al.
  U.S. Pat. No. 3,955,153—G. Marie
  U.S. Pat. No. 3,967,215—J. Bellak
  U.S. Pat. No. 3,995,136—A. Steiger, et al.

(b) Publications:
*Plasmas and Controlled Fusion*, David J. Rose, et al., the MIT Press, 1961, pages 403–409; "The Great Nuclear Fusion Race", *Time*, June 6, 1977, pages 80–81; "Nuclear Fusion: Focus on Tokamak", D. Steiner, *IEEE Spectrum*, July, 1977, pages 32–38.

All of the prior art technology known today has attempted but apparently have not successfully succeeded in providing the proper combination of confinement time, temperature and plasma density necessary to sustain fusion. In an effort to satisfy Lawson's Criterion two separate techniques have generally evolved, one being magnetic containment, while the other is laser or electron beam bombardment. Magnetic confinement schemes fall into two types, the open or "mirror" type configuration wherein magnetic field lines contain the plasma within an axial path, between reflecting end regions and the closed configuration wherein field lines are contained in a torroidal volume and plasma is adapted to travel in a circular path. Both steady state and pulsed reactor systems are envisioned utilizing the concept of magnetic confinement. Confinement known as the "beta pinch" effect has also been experimented with. As to laser induced fusion, the approach is to uniformly radiate a small spherical fuel pellet with focused laser light so as to heat and compress the fuel to a high density for a short confinement time in contrast to magnetic confinement systems where low densities and long confinement times are the factors emphasized. All of the various prior art techniques, per se, have inherent limitation however. It is to these shortcomings that the present invention is directed and which discloses a hybrid system whereby the necessary combination of confinement time temperature and plasma density necessary to sustain fusion is achieved.

SUMMARY OF THE INVENTION

Briefly, the subject invention comprises a method and apparatus for providing nuclear fusion. Two rapidly pulsed synchronized ion beams, comprised of deuterium and tritium for example, having a density in the range of $1 \times 10^{12}$ to $1 \times 10^{15}$ particles per cubic centimeter, are fired into a firing chamber with a velocity of $1 \times 10^8$ centimeters per second. The firing chamber has a longitudinal axial length around which is wound for the entire length thereof a solenoid which is adapted to be periodically pulsed in synchronism with the ion beams to produce a magnetic field which is non-mirrowing parallel to the longitudinal central axis of the firing chamber which acts to guide the beams to a collision course in the center of the firing chamber and hold the compressed fuel in a magnetic field until after ignition. At each end of the firing chamber is an electrically conductive orifice through which the opposing ion beams are fed into the chamber. The orifices have a relatively high potential applied thereacross so that as the two beams approach the center of the firing chamber, an electric arc will be struck across the orifices causing an electron sheath to be formed around the ion beams within the magnetic field. While the magnetic field primarily acts to guide the two ion beams to the center of the firing chamber, it also acts to partially compress the ion beams; however, the electron sheath causes a "pinch" current to flow along the sheath which strips the ion beams of any free electrons providing confinement of beams but more importantly forces the stripped nucleii to a constricted region at the point of beam collision thereby increasing the density, or packing fraction, of the gas in the very center of the firing chamber. The nucleii particle build up will approach densities in the range of $1 \times 10^{21}$ to $1 \times 10^{24}$ in a few microseconds, causing collision heat plus ohmic heating within the sheath to increase at a drastic rate. Neutrons will be dislodged by the sudden change in directions of the atom and nuclear movements causing a break up of the electron concentration between the ends of the beams causing a fuel ball to be formed at the center which increases to a density of $1 \times 10^{21}$ to $1 \times 10^{24}$ particles per cubic centimeter. Following this the fuel ball is ignited by means of at least one but preferably a pair or more of laser or high energy electron beams focused on the fuel ball at the center of the firing chamber, bring the temperature of the fuel to the thermonuclear range. It is the combination of magnetic guiding field, the confinement effect of the electron sheath, the magnetic compression on electrons, ions and sheath, and ignition produced by the laser or high energy electron beams which successfully meets Lawson's Criterion and thus provide a relatively fast pulsed system satisfying the necessary conditions to sustain fusion. The heat produced is transferred exteriorally of the firing chamber for useful applications by means of the magnetic solenoid surrounding the chamber which is comprised of, for example, tubing wrapped around the firing chamber and having liquid sodium circulated therethrough to act not only as the heat transfer medium, but also as a conductor of electricity as well as a neutron absorption means.

DESCRIPTION OF THE PREFERRED EMBODIMENT

Figure 1:
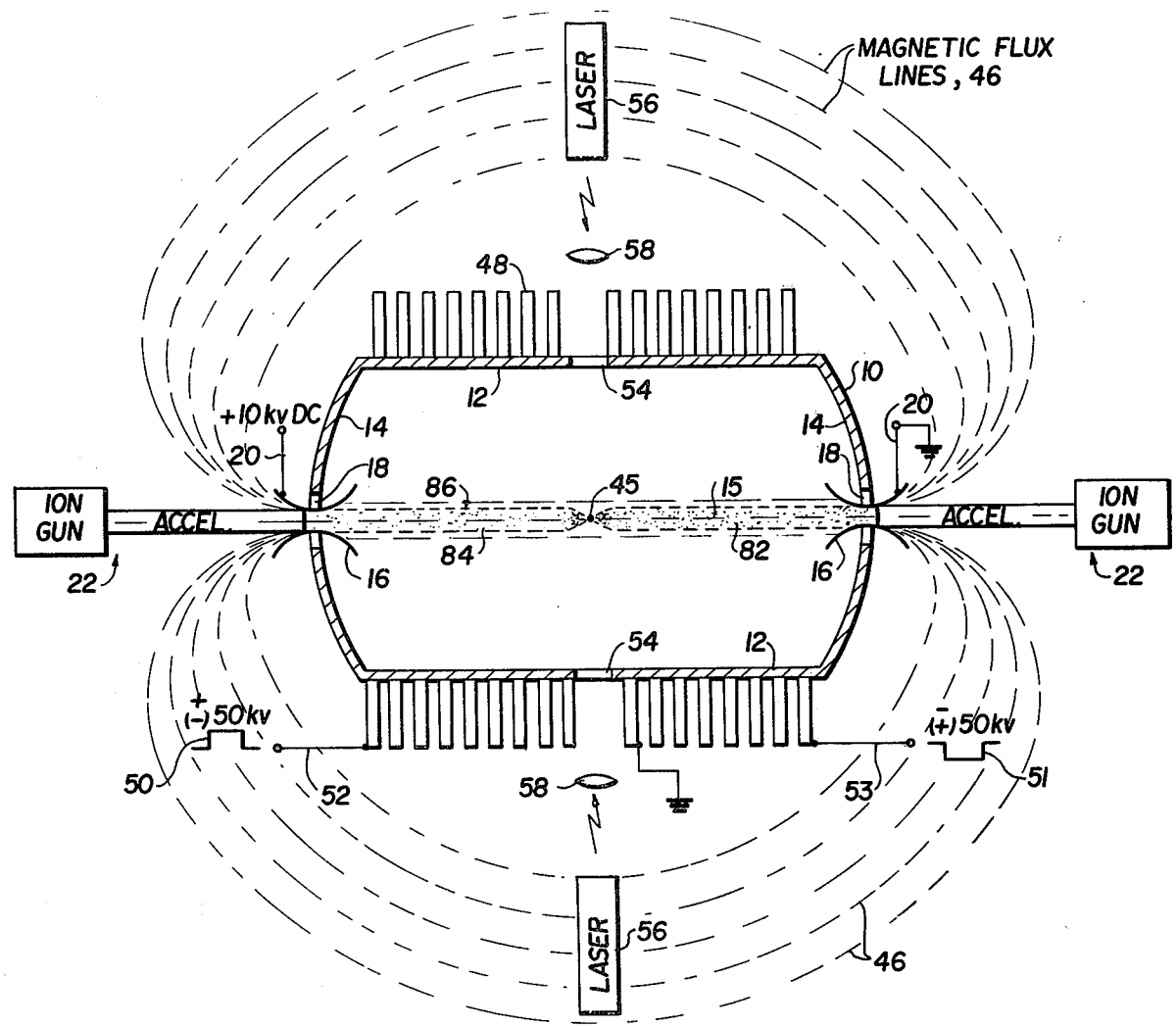
FIG. 1 is a schematic block diagram illustrative of the preferred embodiment of the subject invention.

Referring now to the drawings wherein like reference numerals refer to like parts throughout, attention is directed first to FIG. 1 which is intended to disclose in a block diagram-schematic format the preferred embodiment of the subject invention. Reference number 10, for example, designates a vacuum firing chamber, capable of withstanding heat generated by periodic typically nuclear fusion reactions at its center. The shape of the firing chamber 10 can be of any desired configuration, e.g. ellipitical or rectangular in shape 1.25 meters by 1.0 meter, including broadwall portion 12 and relatively narrower end wall portion 14. The material from which the firing chamber 10 is constructed is non-magnetic so as to permit a magnetic field to be produced along its central longitudinal axis 15, while at the same time adapted to sustain a surface temperature of 2000° F. peak being produced by pulsed nuclear fusion reactions occurring at a rate of 120 to 1200 reactions per second. A pair of electrically conductive orifices 16 are centrally located in opposing end walls 14 so that they are in opposition while being aligned along the central longitudinal axis of the chamber 10. The orifices themselves are identical in configuration and have fluted ends, for example, the inner ends of which project into the interior of the firing chamber for purposes which will become evident as the following description proceeds.

Electrical circuit means 20 are connected to both orifices 16 for applying a relatively high voltage DC potential (in the order of 10,000 volts) across the orifices. The outer ends of the orifices 16 couple to respective plasma or ion gun-accelerator apparatus 22 which are adapted to produce and deliver simultaneously opposing beams of ionized gas, for example deuterium/tritium having a density of substantially $1 \times 10^{14}$ particles per cubic centimeter in a beam diameter in the order of 0.5 to 1.0 millimeters in diameter at a beam velocity of 0.5 to 10 meter per microsecond. Such apparatus is well known in the art, a typical example of which is shown in FIG. 2.

Figure 2:
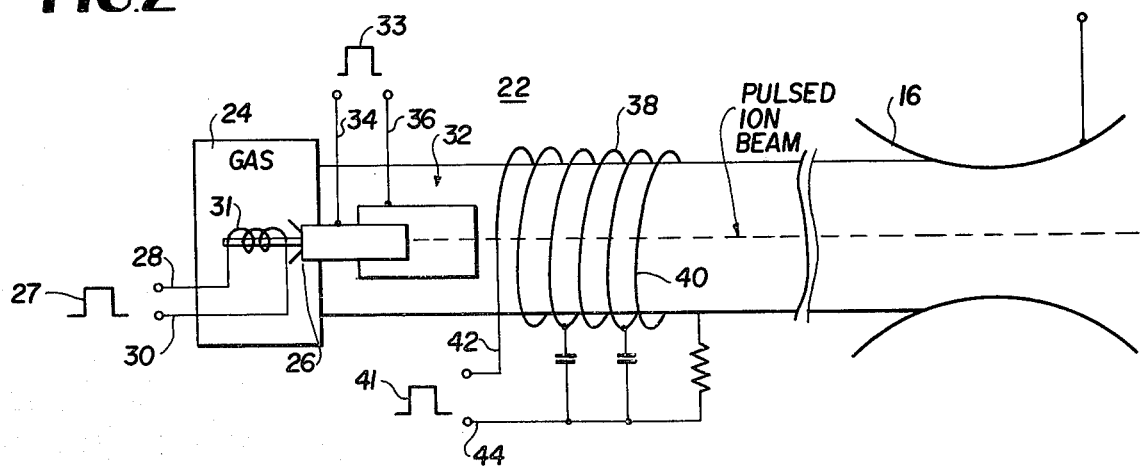
FIG. 2 is an electrical schematic diagram illustrative of a typical ion gun-accelerator utilized in connection with the embodiment shown in FIG. 1.

Referring now briefly to FIG. 2, reference numeral 24 designates a vessel adapted to contain fuel gas e.g. deuterium-tritium from which the ion beam is to be formed. A solenoid operated valve 26 is adapted to be periodically opened by an electrical pulse 27 applied to electrical conductors 28 and 30 coupled to the solenoid 31. Upon the opending of the valve 26, gas enters into a coaxial ionization structure 32 which is adapted to be pulsed by a signal 33 applied conductors 34 and 36 coupled thereto. Forwardly of the ionization structure 32, is an accelerator 38 consisting of, for example, a traveling wave line 40 which is also adapted to be pulsed by means of the signal 41 applied conductors 42 and 44. In operation, the valve 26 is first pulsed open which is follwed by the pulse 33 and 41 simultaneously applied to the ionization structure 22, and the accelerator means 38. By simultaneous operation of both devices 22 at each end of the firing chamber 10, ion beams simultaneously enter opposite ends of the chamber through the orifice 16 and travel in a straight line for a desired point of collision at the center of the chamber.

Figure 3:
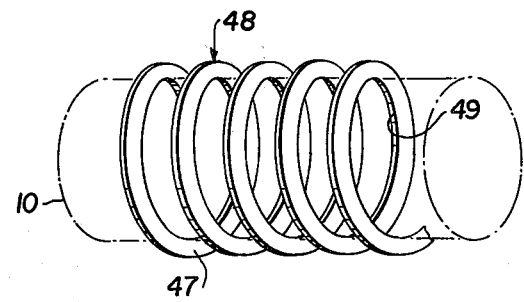
FIG. 3 is a perspective view of the solenoid configuration which is adapted to surround the firing chamber of the embodiment shown in FIG. 1.

In order to guide the two ion beams to a precise collision point 45 (FIG. 1) at the center of the firing chamber 10, a pulsed magnetic field 46 is produced along the central longitudinal axis 15 of the chamber 10 in timed relationship with the ion beams entering the firing chamber 10 through the orifices 16. Accordingly, a non-mirrowing electromagnetic coil structure 48 which is shown in greater detail in FIG. 3 is utilized. The coil structure 48 comprises multiple turns of hollow tubing 47 which are adapted to be wound around the outer surface of the sidewall(s) 12 from one end to the other in a substantially continuous spiral. As shown by FIG. 3, the coils are rectangular in cross-section with the narrow inner wall 49 in contact with the outer surface of the firing chamber 10. Liquid sodium, for example, is adapted to be circulated through the coil structure 48 and serves a multiple purpose, the first being as a conductor of electricity, the second being as an absorber of neutron, and the third being as a conductor of heat away from the firing chamber to an external utilization device, not shown.

The magnetic coil assembly 48 is adapted to be energized by an electric pulse of relatively high voltage, in the order of 100 kilovolts. In order to reduce the magnitude of the pulse applied to the coil, two 50 kilovolt pulses 50 and 51 shown in FIG. 1 of mutually opposite polarities are applied to opposite ends of the coil 48 by means of conductors 52 and 53 with the center of mid point being connected to ground potential. Such a configuration is adapted to produce a magnetic field in the range of 5 to 15 webers per square meter axially through the firing chamber 10.

At the mid point of the sidewall 12, is located a pair of mutually opposed windows 54 which are adapted to transmit laser or electron beam pulses, $10\times10^{-9}$ seconds in pulsewidth, into the firing chamber 10. The laser pulses are generated by means of a pair of lasers 56 which are opposed to one another at substantially right angles to the longitudinal central axis 15 of the firing chamber 10. Intermediate the windows 54 and the lasers 56 are located means 58 for focusing respective laser pulses to the center of the firing chamber 10. The laser pulses are synchronized with the system and occur a short time (1 to 10 microseconds) following fuel ball formation resulting from the combined effect of the axial magnetic field and pinch effect of the electron sheath at the point of collission 45 of the ion beams. The fuel ball being in the order of 0.1 to 0.01 millimeters in diameter and having a density of $1\times10^{21}$ to $1\times10^{24}$ particles per cubic centimeter, upon being hit by the laser pulses will increase in temperature to $1\times10^8$ degrees K thereby reaching fusion temperature. The pulse lenght of the opposing deuterium/tritium ion pulses at speeds of $1\times10^6$ meters per second is made sufficiently long so that fusion will be sustained until the expanding burning fuel both reaches the order of 1 to 2 centimeters in diameter at which time it burns out. Under such conditions, an average surface temperature of the firing chamber 10 of approximately 1600° F. exists.

Figure 6A:
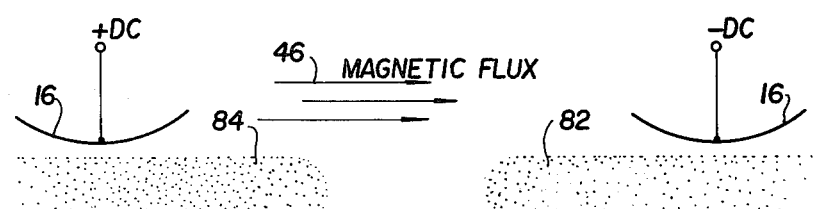
FIGS. 6A-6C are diagrams helpful in understanding the operation of the subject invention.
Figure 6B:
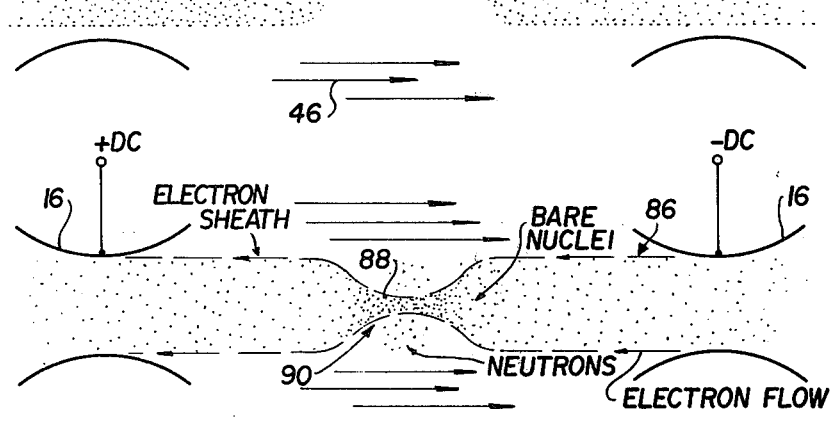
Figure 6C:
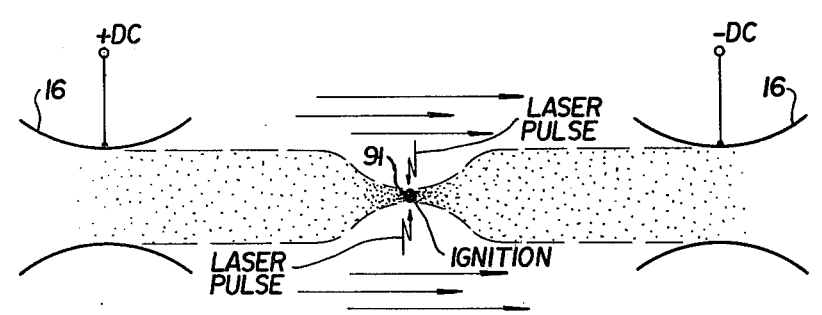

In order to more fully understand the subject invention and its operation, reference is now made to FIG. 4 and subsequently to its operational characteristics as evidenced by the wave forms shown in FIG. 5 and the illustrations of the events leading up to nuclear fusion as shown in FIGS. 6A through 6C.

Figure 4:
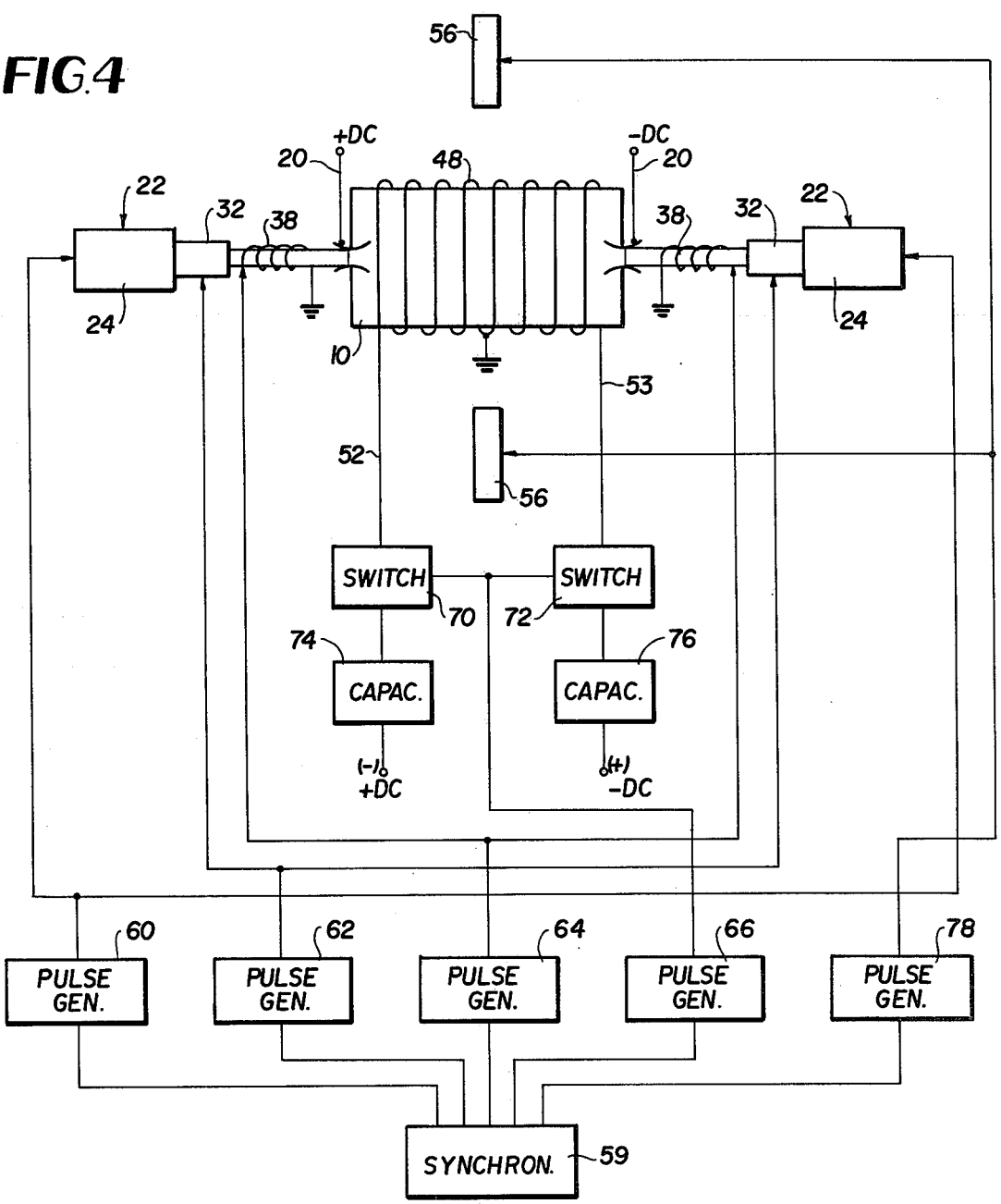
FIG. 4 is an electrical system schematic diagram illustrative of the embodiment shown in FIG. 1.
Figure 5:
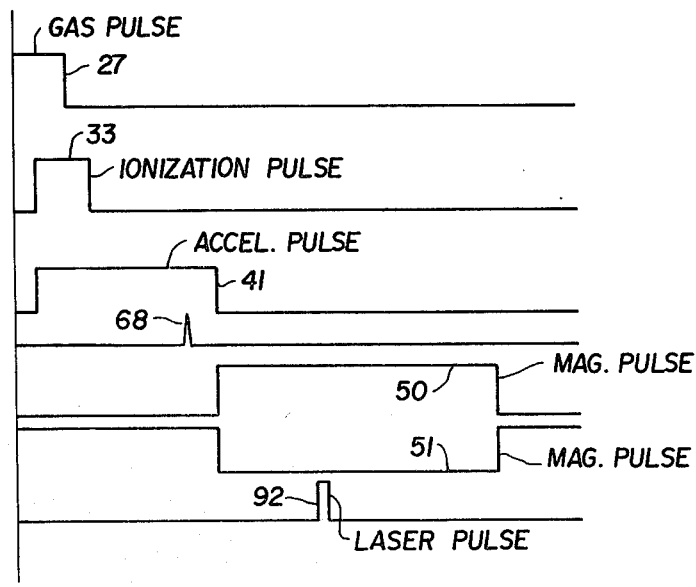
FIG. 5 is a time related diagram illustrative of the pulsed mode of operation of the subject invention.

Referring now to FIG. 4, what is shown is an electrical schematic diagram of the nuclear fusion system shown in FIG. 1 with the peripheral apparatus coupled thereto for providing a pulsed system. In addition to the apparatus shown in FIG. 1, FIG. 4 additionally discloses a master timer or synchronizer circuit 59 which is adapted control the timing sequence required for operation of the subject invention. The synchronizer 59 is adapted to initially trigger a first pulse generator circuit 60 which produces the energizing pulse 27 shown in FIG. 2 which is simultaneously applied to the solenoids 31 in the opposing ion gun-accelerator assemblies 22. Subsequent to the gas pulse 27 being produced at each end, synchronizer 59 triggers a second pulse generator 62 which produces the ionization pulse 33 shown in FIG. 2 which is applied to the respective ionization structures 32. Coincident with the leading edge of the ionization pulse 33, the synchronizer 59 triggers a third pulse generator 64, which generates the accelerator pulse 41. This pulse is applied to the accelerator structure 38 which is adapted to accelerate the respective ion beam to the desired speed of at least 0.5 meter per microsecond thereby providing a relative velocity of 1.0 meter per microsecond for the two beams. This timing sequence is depicted further in FIG. 5. Referring now to FIG. 5, after a time Δt, following the leading edge of pulses 33 and 41, the respective ion beams reach the orifices 16. The synchronizer 58 triggers a fourth pulse generator 66 which causes a pulse 68 shown in FIG. 5 to be generated which is applied to a pair of high voltage switch devices 70 and 72 e.g. ignitions, respectively coupled between a pair of copacitor banks 74 and 76. The capacitor banks are respectively coupled to sources of plus (+) and minus (−) supply potentials, now shown, for being charged to D.C. voltages in the order of 50 kilovolts plus and minus, respectively. Application of the pulse 68 causes the switch means 70 and 72 to become conductive, whereupon the capacitor banks 74 and 76 discharge through the grounded center tapped coil 48, causing the magnetic field 46 to be produced along the central axis 15 of the firing chamber 10 for a period lasting at least until fuel ball ignition occurs. Laser ignition is controlled by fifth pulse generator 78 coupled to the synchronizer 59.

Referring now to FIG. 6A, the magnetic flux of the magnetic field 46 produced by the coil 48 causes mutually opposing ion beams 82 and 84 synchronously produced by the ion gun-accelerator devices 22 to be guided toward one another at a closing rate of one meter per microsecond in a straight line. Since the ion beams 82 and 84 are generated and accelerated simultaneously under the same operating conditions, they will meet on a collision course at the center of the firing chamber 10. For a 0.1 centimeter diameter ion beam having a density in the order of $1\times10^{14}$ particles per cubic centimeter, $1\times10^{14}$ free electrons are available since deuterium/tritium has one electron per particle. An arc of electron current will occur as the two ion beams 82 and 84 meet, as shown in FIG. 6B which acts to strip electrons from the ions and provide an electron flow in the form of a sheath 86 around the ion beam leaving bare nuclei 88 to build up in a constricted region 90 where the two beams collide.

The removal of the electrons reduces the diameter of the particles and due to the electron heating in the arc, additional temperature is provided, causing the bare nuclei to condense at the center with the two beams collapsing at the rate of one meter per microsecond. Due to stricture at the region 90 any particles that go by the center will be slowed down and turned around until all particles converge. Some of the particles will be bounced across the mouth of the constriction 90 adding to the density of this portion of the fuel flow. Particles that bounce off the sheath and route to the center will increase or decrease their spin depending upon their related spin and the direction of flow rate of the electrons in the sheath at the point of reflection. If there is an electron left on a particle when it is bounced back into the fuel flow beam, it will be ripped off and carried with the electrons in the sheath 86.

As the deuterium/tritium fuel gas enters into the firing chamber 10 from the orifices 16, most if not all electrons will be removed by the action of the arc current flowing between the two orifices through the arc in the center of the firing chamber. The continual guiding and closing effect of the magnetic pressure on the beams as well as the "pinch" effect of the electron sheath 86 act to keep the fuel beams as tight as possible along with reducing the density of the beams. As a consequence, a fuel ball 91 shown in FIG. 6C forms in the center where the beams meet. With the increase in density and the added temperature some fusion will occur, causing the fuel supply to start to grow in size. At this time a pulse from generator 78 triggers the pair of lasers 56. An ignition pulse 92 shown in FIG. 5 and shown in FIG. 6C as a pair of laser pulses is directed to the fuel ball 91 which ignites, providing temperature in the order of $1\times10^{8°}$ K to $3.5\times10^{8°}$ K which constitutes fusion temperature. Since the system is pulsed, the fuel must be exhausted by the time the burning fuel ball reaches 2 centimeters in diameter. With these temperature, the square law distribution will reduce the surface temperature to the order of magnitudes that can be tolerated by the firing chamber 10.

Typically, the firing chamber 10 may be constructed of quartz ceramic or the like and has dimensions in the order of 120 centimeters for its axial lenght, while being in the order of 100 centimeters across. The coil structure 40 consists of 25 turns around the outer surface of the firing chamber and the synchronizer 58 is adapted to pulse the system between the ranges of 120 and 1200 pulses per second. This is what might be referred to as the fact pulsed system, in relation to presently contemplated pulses systems, but is feasible in that the fuel density will be adequate for burning the fuel ball in 5 to 100 microseconds. Although not shown, an additional electromagnetic coil assembly when desirable, may be included for providing a bias magnetic field to aid in centering the two ion beams on a collision course across the firing chamber. Also when desirable the firing chamber may be elliptical in shape or spherical, being in the order of 1 meter in diameter.

Thus what has been shown and described is a nuclear fusion of a fuel ball formed by the collision of two opposing ion beams which are guided to the center of the chamber by means of a magnetic field and being partially confined thereby but additionally being further confined by means of an electron sheath, causing a pinch effect at the center of the firing chamber where the beams collide followed by thermal excitation of the fuel ball by means of at least one but preferably a pair of lasers or high energy electron beams.

While there has been shown and described what is at present considered to be the preferred method and embodiment of the subject invention, modifications thereto will readily occur to those skilled in the art. It is not desired, therefore, that the invention be limited to the specific steps and arrangements shown and described, but it is to be understood that all equivalents, alterations and modifications coming within the spirit and scope of the present invention, are herein meant to be included.

What is claimed is:

1. A method of providing a nuclear fusion reaction comprising the steps of:
    simultaneously generating in a pulsed mode of operation two ion beams of predetermined pulse length;
    accelerating and feeding said beams into a firing chamber through a pair of orifices mutually opposing one another to effect a collision course of said ion beams within the firing chamber;
    applying a voltage potential across said pair of orifices;
    generating a pulsed magnetic field through said firing chamber along a linear axis between said orifices at a time substantially coincident with the passage of said ion beams through the respective orifices into said firing chamber to guide said ion beams to a collision course in the center of said firing chamber;
    said potential across said orifices producing an electric arc as the two ion beams approach one another causing electrons to be stripped from the respective ion beams and forming an electron sheath around said ion beams, causing a pinch effect at the region of collision of said ion beams thereby confining and increasing the density of the beams at said region of collision and causing a fuel ball to be formed thereat; and
    directing a pulsed high energy beam to the region of said collision to raise said fuel ball to fusion temperature.

2. The method as defined by claim 1 wherein said step of applying said potential across said orifices comprises applying a relatively high voltage D.C. potential across said orifices.

3. The method as defined by claim 1 wherein said step of generating said pulsed magnetic field additionally includes terminating said magnetic field at the end of said fuel ball burn prior to the generation of the subsequent ion beam pulses.

4. The method as defined by claim 1 wherein said magnetic field comprises a non-mirroring magnetic field.

5. The method as defined by claim 1 wherein said step of applying a pulsed high energy beam comprises applying at least one pair of opposed high energy beams to said region of said fuel ball.

6. The method as defined by claim 5 wherein said beams are applied substantially transverse to the path of travel of said ion beams.

7. The method as defined by claim 5 wherein said at least one pair of high energy beams comprises simultaneously generated laser pulses which are directed to the region of collision of said ion beams.

8. The method as defined by claim 5 wherein said at least one pair of high energy beams comprises high energy electron beams applied simultaneously to opposite sides of said collision region.

9. The method as defined by claim 1 wherein said step of generating and accelerating said ion beams comprises a step generating a pair of deuterium/tritium ion beams having a density in the range of substantially $1 \times 10^{12}$ to $1 \times 10^{15}$ particles per cubic centimeter and accelerating each of said beams to a velocity of at least one-half meter a microsecond.

10. A fusion reactor, comprising in combination:
    an evacuated firing chamber having a pair of opposed electrically conductive orifices for translating a respective ion gas beam into said chamber;
    means coupled to said pair of orifices for applying an electrical potential of predetermined magnitude thereacross;
    first and second simultaneously pulsed ion beam forming and accelerating means respectively coupled to said pair of orifices for delivering a pair of ion beams into said chamber for a predetermined pulse period at a velocity to cause mutual collision of said beams along a common linear path within said chamber;
    means synchronized with said beam forming and accelerating means for generating a pulsed magnetic field along said linear path when said pair of ion beams enter said chamber through said orifices to guide said beams to a desired region of collision within said chamber;
    said electrical potential across said orifice operating to cause an electric arc to be formed at said region of collision as said beams approach one another, causing electrons to be stripped from the ions in said beams and form a sheath of electron current around said beams between said orifices, thereby confining said beams along said linear path and increasing the density of the gas at said region of collision to form a fuel ball; and means synchronized with said beam forming and accelerating means as well as said magnetic field generating means for producing and directing a high energy pulse to said fuel ball for increasing the temperature of said fuel ball to a predetermined magnitude.

11. The fusion reactor as defined by claim 10 and additionally including electrical circuit means coupled to said beam forming and acceleration means and said magnetic field generating means for synchronizing the operation of said reactor in a pulsed mode of operation.

12. The reactor as defined by claim 10 wherein said electrical potential of predetermined magnitude comprises a D.C. potential.

13. The reactor as defined by claim 12 wherein said predetermined magnitude of said D.C. potential is in the kilovolt range.

14. The reactor as defined by claim 10 wherein said ion beam forming and accelerating means includes a source of deuterium/tritium.

15. The fusion reactor as defined by claim 10 wherein said beam forming and accelerating means provides a pulsed beam of deuterium/tritium gas having a density of substantially $10^{14}$ particles per cubic centimeter.

16. The fusion reactor as defined by claim 10 wherein said orifices have fluted end portions projecting into said firing chamber.

17. The fusion reactor as defined by claim 10 wherein said pair of orifices have a separation distance of at least one meter and wherein said beam forming and accelerating means provides ion beams having a respective forward beam velocity of at least $0.5 \times 10^6$ meters per second.

18. The fusion reactor as defined by claim 10 wherein said means for generating the magnetic field comprises a center tapped coil assembly having electrical pulses of opposite polarity applied to opposite ends thereof.

19. The fusion reactor as defined by claim 10 wherein said means for generating said magnetic field comprises a coil assembly on the outside of said firing chamber and having the ends thereof substantially coextensive with the distance between said orifices.

20. The fusion reactor as defined by claim 19 wherein said coil assembly is contiguous with the outer surface of said firing chamber and includes means for conducting the heat of fusion away from said firing chamber to external utilization means.

21. The fusion reactor as defined by claim 19 wherein said magnetic coil assembly includes an interior liquid conducting passage coextensive with its length and additionally including liquid sodium circulated through said passage.

22. The fusion reactor as defined by claim 10 wherein the region of collision comprises the center of said firing chamber and wherein said means for producing and directing said high energy pulse to said fuel ball comprises at least one pulsed laser system coupled into said chamber to said region of collision.

23. The fusion reactor as defined by claim 10 wherein said region of collision comprises the center of said firing chamber and wherein said means for producing and directing said high energy pulse comprises a pair of mutually opposed simultaneously pulsed lasers coupled into said region of collision and being oriented substantially transverse to said linear path within said chamber.

24. A fusion reactor as defined by claim 10 wherein said means for producing and directing said high energy pulse to said fuel ball comprises a pair of pulsed high energy beam forming means directed to said fuel ball along the path transverse to said linear path of said ion beams.

* * * * *